United States Patent [19]

Trabelsi

[11] Patent Number: 5,439,737
[45] Date of Patent: Aug. 8, 1995

[54] TWO-PHASE FUSIBLE INTERLINING MADE OF A SEMI-INTERPENETRATING NETWORK OF THERMOPLASTIC RESINS

[75] Inventor: Mohamed F. Trabelsi, Péronne, France

[73] Assignee: Lainiere de Picardie, Peronne, France

[21] Appl. No.: 33,843

[22] Filed: Mar. 19, 1993

[30] Foreign Application Priority Data

Apr. 10, 1992 [FR] France ............... 92 03734

[51] Int. Cl.⁶ .................. B32B 7/12; C08F 20/00
[52] U.S. Cl. .................. 428/317.7; 428/319.3; 428/319.7; 428/319.9; 428/414; 428/474.4; 428/480; 428/482; 428/500; 525/165; 525/178; 525/423; 525/426; 525/438; 525/451; 525/533; 525/903
[58] Field of Search ............ 525/438, 165, 178, 423, 525/426, 451, 533, 903; 428/317.7, 319.3, 474.4, 482, 317.5, 319.7, 319.9, 414, 480, 500

[56] References Cited

U.S. PATENT DOCUMENTS

| | | | |
|---|---|---|---|
| 3,979,540 | 9/1976 | Moffett | 428/414 |
| 4,243,702 | 1/1981 | Walsh | 525/184 |
| 4,340,632 | 7/1982 | Wells et al. | 428/90 |
| 5,061,546 | 10/1991 | Groshens et al. | 428/196 |
| 5,200,451 | 4/1993 | Wright | 523/456 |

FOREIGN PATENT DOCUMENTS

| | | |
|---|---|---|
| 0099448 | 4/1983 | European Pat. Off. . |
| 0329493 | 8/1989 | European Pat. Off. . |
| 2241604 | 3/1975 | France . |
| 1956605 | 6/1970 | Germany . |
| 1694245 | 7/1971 | Germany . |
| 55-142051 | 11/1980 | Japan . |
| 58-76476 | 5/1983 | Japan . |

*Primary Examiner*—Robert E. Sellers
*Assistant Examiner*—Randy Gulakowski
*Attorney, Agent, or Firm*—Kane, Dalsimer, Sullivan, Kurucz, Levy, Eisele and Richard

[57] ABSTRACT

A fusible interlining has a textile substrate employed with a single adhesive layer and is intended to be bonded to drapery. The adhesive layer includes a first phase in the form of thermoplastic powder of dense granules whose primary function is to ensure the adhesion of the fusible interlining to the drapery at the time of bonding. A second phase of the adhesive layer is a crosslinkable system including a crosslinkable resin and a hardener in the form of a homogeneous matrix whose main function is to coat the granules of the thermoplastic powder of the bonding system.

11 Claims, No Drawings

TWO-PHASE FUSIBLE INTERLINING MADE OF A SEMI-INTERPENETRATING NETWORK OF THERMOPLASTIC RESINS

BACKGROUND OF THE INVENTION

The invention relates to a two-phase fusible interlining and to a process for its manufacture.

In general, fusible interlinings must be capable of being stored after the textile substrate has received the layer of polymers and are intended, owing to the effect of the change in an external parameter, to become adhesive, thus enabling them to adhere to another fabric.

Fusible products are now commonly employed in the textile industry, for example as reinforcing fabrics, their application to linings or to draperies making it possible to modify the characteristics of the fabrics, improving their behaviour and their liveliness. The textile substrates used are very varied. They may be woven, knitted or nonwoven.

The methods of application of the adhesive layer to its substrate are numerous. For many uses, an application using spots, which allows the fabrics to retain a great flexibility, is preferred, whereas for other uses a continuous layer of adhesive enables the required properties to be attained more satisfactorily.

In the case of reinforcing fabric, the textile substrate is coated with the fusible substance. At present, this coating is in most cases a coating using spots produced with the aid of an engraved roll. The fusible polymers, initially in powder or paste form, are heated to a temperature which enables them to melt and to adhere to the substrate. According to another technique, the coating is produced by transfer, that is to say that the fusible polymers are deposited in spot form by a printing roll onto a carpet treated to be nonadhesive; these spots are then transferred at a lower temperature onto the textile substrate.

The fusible interlining thus obtained is then stored at room temperature. It is then necessary that the various layers of this product, when in contact, should not adhere to each other. The fusible interlining must not exhibit stickiness and adhesive properties ("tack") at room temperature.

During this storage it is also necessary that the aging process of the product should not interfere with its adhesive properties which are necessary for the subsequent bonding.

The fusible interlining is therefore employed by manufacturers who apply it against other fabrics, draperies or linings, and thus produce the adhesive bonding of the reinforcing fabric to the drapery with the aid of a press at pressures of a few decibars to a few bars for relatively short times of the order of 10 to 30 seconds and at temperatures which are generally higher than 100° C. During this stage the polymers of the fusible interlining must regain their adhesiveness. However, they must not have a viscosity which is too low for too long a time during this operation because otherwise the polymers pass through the textile substrate or the drapery, giving rise to backflow and break-through problems which make the products obtained relatively unattractive and frequently unusable.

Finally, the finished garments and therefore, in particular, the draperies or linings provided with reinforcing fabrics must stand up to the different methods of use, washing, ironing and the like. The bonding produced in the preceding stage must therefore withstand difficult environments.

Many attempts have been made to produce products which are well-suited to the different constraints resulting from the combination of the stages referred to above.

Thus, it has been proposed, for example, to produce an adhesive consisting of two or a number of layers of polymers of different physical characteristics. By suitably choosing the viscosity and the melting temperature of these different layers it is thus possible to limit the break-throughs or the backflows (documents FR-A-2,318,914, DE-A-2,461,845, FR-A-2,576,191). However, the use of these techniques shows either a lack of mechanical cohesion of the two polymer layers or processing difficulties which are difficult to overcome, or poor uniformity of the second layer.

Document FR-A-2,023,354 describes a heat-weldable double lining consisting of a textile structure coated on at least one of its faces with a polymer or a mixture of polymers which is essentially uncrosslinked at the time of the application. At least a fraction of this coating is converted by heating into insoluble plastic and exhibits a porous or foam structure at least at the time of the heat-welding.

More recently, the document U.S. Pat. No. 3,937,859 describes a thermoplastic/thermally crosslinking composition in which the thermoplastic part is a copolymer of olefin and of vinyl chloride. The presence of chlorine, a hyperreactive polymerisation site, gives rise to problems with regard to the control of the routing of the crosslinking reaction and consequently results in poor aging of the textile product.

It emerges that the use of fusible interlinings is confronted with the following problems:
- interpenetration of the two layers, during the coating, by mixing of the base of the spot of the upper layer with the top of the spot of the underlayer;
- hardening of the textile when the coating is too great in weight;
- difficult control of the rate and degree of progress of the crosslinking reaction of the reactive system and of the aging of the fusible interlining at the time of storage.

OBJECTS OF THE INVENTION

A first objective of the present invention is therefore to propose a fusible interlining which, on the one hand, makes it possible to overcome the abovementioned disadvantages and, on the other hand, does not break through the drapery and does not produce backflow, that is to say does not break through the textile substrate of the interlining, the bond strength of which is increased by a considerable factor and which exhibits a clearly improved aging with time.

More particularly, the aim of the present invention is to propose the use of a single adhesive layer exhibiting a two-phase structure forming part of the structure of the fusible interlining and ensuring a good bond strength, the removal of break-throughs with steam, good retention of the thermofusible-drapery complex to steaming-dry cleaning cycles, and good resistance to washing at high temperature.

A second objective of the invention is to propose a process for the manufacture of a fusible-drapery composite.

BRIEF STATEMENT OF THE INVENTION

To this end, the invention proposes first of all a fusible interlining comprising a textile substrate used in combination with a single adhesive layer and intended to be bonded to a drapery.

According to the invention the adhesive layer used in combination with the textile substrate has a two-phase structure comprising:

(i) at least one adhesive system in the form of a thermoplastic powder of dense granules whose main function is to ensure the adhesion of the fusible interlining to the drapery at the time of the bonding;

(ii) at least one crosslinkable system comprising at least one crosslinkable resin and at least one hardener, in the form of a homogeneous matrix whose main function is to coat the granules of thermoplastic powder of the bonding system.

The hardener(s) of the crosslinkable system is (are) chosen from the group including modified melamine resins in the form of prepolymers.

The modified melamine resin prepolymers are chosen from the group including prepolymers which have a degree of polymerisation of between approximately 1 and 3.

According to a first possible embodiment, the modified melamine resins are chosen from the group including partially alkylated modified melamine resins with a high content of imine functional group:

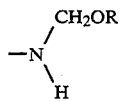

in which the radical R is chosen from the group including methyl, ethyl, propyl, butyl and isobutyl radicals.

According to a second possible embodiment the modified melamine resins are chosen from the group including fully alkylated modified melamine resins:

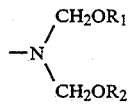

in which the radicals $R_1$ and $R_2$ are identical or different and are chosen from the group including methyl, ethyl, propyl, butyl and isobutyl radicals.

The crosslinkable resin of the crosslinkable system is chosen from the group including polymers which are soluble in water or in a solvent medium. In particular, the crosslinkable resin is chosen from the group including epoxy resins, alkyd resins, polyester resins and acrylic resins, by themselves or mixed with each other.

In addition, the crosslinkable system may include a crosslinking catalyst chosen in particular from the group including para-toluenesulphonic acid, oxalic acid, phosphoric acid, ammonium chloride and magnesium chloride.

The thermoplastic powder of the adhesive system, for its part, consists of one or a number of thermally adhesive thermoplastic polymers chosen from the group including polyamides and polyesters, by themselves or mixed with each other, the polymers being chosen in particular from the group including polymers which have a melting point between 80° C. and 130° C., the thermoplastic powder having a particle size of between approximately 1 and 100 μm.

The invention also proposes a fusible-drapery composite in which the chains of thermoplastic polymers of the adhesive system are trapped in a crosslinked network formed by the crosslinkable resin and the hardener(s) of the crosslinkable system, thus forming semiinterpenetrated polymer networks.

Finally, the invention proposes a process for the manufacture of fusible-drapery composites in which a textile substrate receives a coating using spots of an adhesive layer with the aid of an engraved roll.

According to the invention such a process comprises the following successive stages:

a crosslinkable system comprising at least one crosslinkable resin and at least one hardener is prepared in the form of a homogeneous matrix;

the coating paste is prepared by dispersing a thermoplastic powder in the said matrix;

the coating paste thus prepared is applied onto a textile substrate by coating using spots on a rotary frame;

the whole is subjected to a drying temperature lower than that of the onset of crosslinking;

at the time of the bonding of the fusible to the drapery, the crosslinking reaction is set in motion by passing continuously through a press heated to a temperature of the order of 130° C., at a pressure of a few bars and for a relatively short time of the order of 15 seconds;

the crosslinking reaction is completed by passing the fusible-drapery composite through an oven heated to a temperature of the order of 150° C. for a period of between of the order of 30 to 60 seconds.

The use of an adhesive layer exhibiting a two-phase structure comprising an adhesive system in the form of thermoplastic powder and a crosslinkable system in the form of homogeneous matrix offers a number of advantages:

the particles of the thermoplastic powder, which are perfectly coated and bound by the crosslinkable system, act as a filler which makes it possible to keep the whole at a sufficiently high viscosity to avoid its entry into the textile substrate.

drying of the fusible interlining at a temperature below the crosslinking temperature makes it possible to slightly soften the thermoplastic powder which remains in the form of granules and to bond the adhesive layer sufficiently to the textile substrate.

the strong presence of imine (—NH) functional group in the modified melamine, besides reactive groups (hydroxyl, carboxyl and the like) in the crosslinkable resin, imparts a high reactivity to the crosslinkable system of the adhesive layer of the fusible interlining.

Now, it is well known that the bond strength is directly related to the degree of progress of the crosslinking reaction. The higher the reactivity of the crosslinkable system in the adhesive layer, the greater the increase in this bond strength after crosslinking.

The efficiency of this crosslinking reaction is reflected in:

the increase in bond strength;

the elimination of break-throughs with steam;

good resistance of the fusible-drapery composite to steaming-dry cleaning cycles without the least blistering;

good resistance to washing at high temperature above or equal to 45° C.

Other characteristics and advantages of the invention will appear on reading the detailed description and the examples which are to follow.

DESCRIPTION OF THE INVENTION

The fusible interlining according to the invention comprises a textile substrate used in combination with a single adhesive layer. It is intended to be bonded to a drapery. The textile substrate used may be of different kinds. It may be woven, knitted or nonwoven.

The adhesive layer is therefore used in combination with the textile substrate, which means that it is in contact with the textile substrate.

The single adhesive layer is made of plastic and consists essentially of two systems whose expected functions are different.

More particularly, the single adhesive layer exhibits a two-phase structure comprising:

at least one adhesive system in the form of a thermoplastic powder with dense granules whose main function is to ensure the adhesion of the fusible interlining to the drapery at the time of the bonding;

at least one crosslinkable system comprising at least one crosslinkable resin and at least one hardener, in the form of a homogeneous matrix, whose main function is to coat the granules of thermoplastic powder of the adhesive system.

According to the invention the adhesive system is therefore in the form of a thermoplastic powder of dense granules.

Dense granules is the name given to granules which, in contact with the crosslinkable homogeneous matrix or when they are subjected to a drying temperature lower than that of the onset of the crosslinking reaction, do not dissolve and retain a degree of compacting which is appreciably identical to the initial one.

The thermoplastic powder of dense granules has a particle size of between approximately 1 and 100 μm.

It generally consists of a single or of a mixture of thermally adhesive thermoplastic polymers.

These thermoplastics of linear chemical structure do not contain any reactive chemical functional groups capable of causing a chemical transformation, namely a crosslinking.

They soften under the effect of heat and harden in the cold, doing this reversibly.

The thermoplastic powder of the adhesive system consists of one or a number of thermally adhesive thermoplastic polymers chosen from the group including polyamides, polyesters, by themselves or mixed with each other.

The polymers of the thermoplastic powder are chosen from the group including polymers which have a melting point between 80° C. and 130° C.

The single adhesive layer exhibiting a two-phase structure also comprises a crosslinkable system whose main function is to coat the dense granules of thermoplastic powder.

This crosslinkable system is intended to react under the effect of heat and pressure, causing curing of the adhesive layer.

Once crosslinked, this system limits the breakthroughs with steam, or even eliminates them and endows the fusible-drapery composite with good resistance to wear, particularly to cleaning agents for garments and to washing at a high temperature above or equal to 45° C.

The crosslinkable system comprises at least one crosslinkable resin and at least one hardener in the form of a homogeneous matrix.

The crosslinkable resin of the type according to the invention is chosen from the group including polymers which are soluble in water or in solvent medium.

More particularly, the crosslinkable resin of the type of the invention is chosen from the group including epoxy resins, alkyd resins, polyester resins and acrylic resins, by themselves or mixed with each other.

These polymer chains, which are soluble in water or in solvent medium, contain carboxylic, hydroxyl or amide groups which enable them to undergo an irreversible chemical reaction, known as crosslinking reaction, when they are heated to a very precise temperature known as the crosslinking or curing temperature.

This process is generally caused and accelerated by the addition of a hardener and of a catalyst.

The hardener(s) or crosslinking agent(s) is(are) chosen from the group including modified melamine resins in the form of prepolymers.

The modified melamine resin prepolymers are chosen from the group including prepolymers which have a degree of polymerisation of between approximately 1 and 3.

The degree of polymerisation is the name given to the average number of triazine units per molecule.

The modified melamine resins of the type of those employed in the present invention have the following general formula:

EXAMPLE OF MELAMINE STRUCTURE

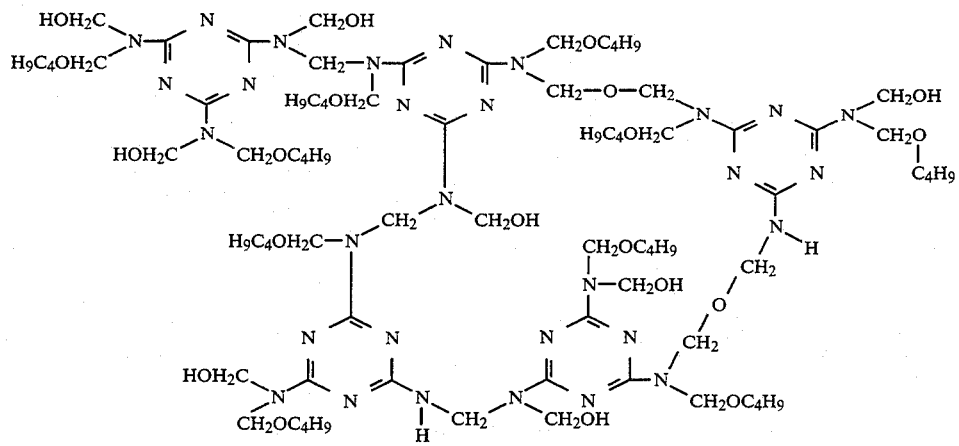

Various modified melamine resins have been employed in the present invention.

According to a first embodiment the modified melamine resins are chosen from the group including partially alkylated modified melamine resins with a high content of imine functional group:

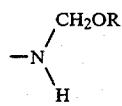

in which the radical R is chosen from the group including methyl, ethyl, propyl, butyl and isobutyl radicals.

According to a second embodiment the melamine resins are chosen from the group including fully alkylated modified melamine resins:

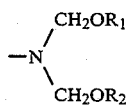

in which the radicals $R_1$ and $R_2$ are identical or different and chosen from the group including methyl, ethyl, propyl, butyl and isobutyl radicals.

The nature and the degree of alkylation have much influence on the rate of the crosslinking reaction of the crosslinkable system and on the aging of the finished fusible interlining at the time of storage.

The crosslinkable system may additionally comprise a crosslinking catalyst.

The latter is chosen from the group including paratoluenesulphonic acid, oxalic acid, phosphoric acid, ammonium chloride and magnesium chloride.

The invention also relates to a fusible-drapery composite which is such that it consists of a fusible interlining of the type described above in which the chains of thermoplastic polymers are trapped in a crosslinked network formed by the crosslinkable resin and the hardener(s) of the crosslinkable system.

The formation of semiinterpenetrated polymeric networks is thus present.

The invention finally relates to a process for the manufacture of fusible-drapery composite, in which a textile substrate receives a coating using spots of an adhesive layer with the aid of one engraved roll (silk-screen printing frame and photoengraving roll).

In this process:

A crosslinkable system is prepared comprising at least one crosslinkable resin and at least one hardener, in the form of a homogeneous matter.

The coating paste is then prepared by dispersing a thermoplastic powder in the said matrix.

Following which, the coating paste thus prepared is applied onto a textile substrate by coating using spots on a rotary frame.

The whole (textile substrate + coating paste) is then subjected to a drying temperature which is lower than that of the onset of crosslinking.

This stage of the process makes it possible to evaporate the water and possibly the solvents, to soften the thermoplastic powder without the thermoplastic matter of which it consists being completely melted, this being in order to bond the adhesive layer sufficiently to the textile substrate.

The granules of the thermoplastic powder soften under the effect of the drying temperature. It is therefore understandable that the thermoplastic powder remains in the form of granules after the drying stage, only the consistency of the granules is slightly less dense than initially.

The granules of thermoplastic powder which are employed in the present invention have, in fact, two functions:

on the one hand, they enable the adhesive layer to bond onto the textile substrate;

on the other hand, these granules of thermoplastic powder, perfectly coated and bonded by the crosslinkable system, act as a filler which makes it possible to keep this system at a sufficiently high viscosity to avoid and minimise its entry into the textile substrate.

After drying, the adhesive layer exhibits a two-phase structure with dense granules of thermoplastic matter in a homogeneous matrix consisting of the crosslinkable polymer, of the hardener or crosslinking agent and optionally of the catalyst.

The fusible textile interlining obtained in this first stage can then be stored at room temperature.

Subsequently, at the time of the bonding of the fusible to the drapery, the crosslinking reaction is set in motion by passing continuously through a press heated to a temperature of the order of 130° C., at a pressure of a few bars and for a relatively short time of the order of 15 seconds.

According to an important characteristic of the invention, the crosslinking reaction is completed by passing the fusible-drapery composite through an oven heated to a temperature of the order of 150° C. for a period of between of the order of 30 to 60 seconds.

Following the preparation of the coating paste by dispersion of the thermoplastic powder in the homogeneous matrix, the paste may also be thickened with a thickening agent.

The product of the present invention requires an accurate mixing of resin, hardener and catalyst.

The time needed for the crosslinking depends therefore on the applied temperature, the quantity and the nature of the hardener and of the catalyst which are introduced into the crosslinkable system and may vary from a few seconds to a few minutes.

EXAMPLES

By way of nonlimiting examples it is possible to refer to the following experimental results obtained in the case of a fusible interlining whose adhesive layer has the following typical formulation:

| | | |
|---|---|---|
| Acrylic resin | 20% | |
| Modified melamine | 6% | |
| Catalyst | 1% | |
| Polyamide | 30% | |
| Water + adjuvants | 42% | |
| Thickener | 1% | |

The coating weight is generally between 10 and 30 g/m$^2$.

EXAMPLE 1

The modified melamine resins given in this example, in which the degree of polymerisation is of the order of 2 to 3, are partially alkylated with a high proportion of imine (—NH) functional group:

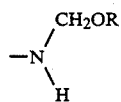

in which the radical R is chosen from the group including methyl, ethyl, propyl and isobutyl.

The coating weight is of the order of 15 g/m$^2$.

The results are shown in the table below:

| | Bond strength (g/cm) before crosslinking | Steam break-throughs before crosslinking (g/cm) | Bond strength after crosslinking 1' at 150° C. (g/cm) | Steam break-throughs after crosslinking (g/cm) |
|---|---|---|---|---|
| Before aging | 250 | 50 | 500 | 0 |
| After aging 3 months at 25° C. | 125 | 20 | 150 | 10 |
| % drop | 50% | | 70% | |

The strong presence of imine functional group in the modified melamine, besides those of the reactive groups (hydroxyl, carboxyl, etc.) of the acrylic resin impart a high reactivity to the reactive system (crosslinkable system) of the adhesive layer of the fusible interlining.

The crosslinking reaction of this reactive system is set in motion at the time of the bonding of the fusible interlining to the drapery, which is carried out continuously in a press heated to a temperature of the order of 130° C. at a pressure of a few bars and for a relatively short time of the order of 15 seconds.

This curing reaction will be completed by passing the fusible-drapery composite through an oven heated, for example, to 150° C. for a period of time of between 30 seconds and 60 seconds.

In fact, during this bonding, the thermoplastic powder melts completely, enabling the polymer chains of the polyamide to interpenetrate with those of the acrylic resin, while bonding mechanically to the textile fibres.

The crosslinking reaction of the acrylic resin in the presence of the modified melamine and of the catalyst reinforces this mechanical bonding, which accounts for the increase in the bond strength after crosslinking of the reactive system.

The formation of semiinterpenetrated polymer networks is therefore present, that is to say that the chains of the thermoplastic polymer (polyamide) are trapped in a crosslinked network formed by the acrylic resin and the modified melamine.

As stated above, this increase in the strength of adhesion is directly related to the degree of progress of the crosslinking reaction.

The higher the reactivity of the reactive system in the adhesive layer, the greater the increase in the strength after crosslinking (see table below and Example 2).

The efficiency of this crosslinking reaction is reflected in:
  the increase in the bond strength, which rises from 250 g/cm to 500 g/cm;
  the elimination of the break-throughs with steam;
  the good resistance of the drapery-fusible composite to the steaming cycle followed by a dry cleaning cycle without the least blistering (20 cycles);
  the good resistance to washing at high temperature above or equal to 45° C.

However, this high reactivity of the crosslinkable system in the adhesive layer of the fusible speeds up the aging process and makes the fusible product almost unusable after a relatively short period of the order of three months at room temperature (25° C.).

This poor aging with time is reflected in a drop of 50% in the bond strength for an uncrosslinked product, of 70% in the same product with crosslinking and of the renewed appearance of break-throughs with steam even in the composite after it has passed through the crosslinking oven.

The fusible interlining described in this example is therefore intended rather for the case where the storage of this interlining is of the order of three months.

EXAMPLE 2

The modified melamine resins given in this example, whose degree of polymerisation is between 1.6 and 2.9, are fully alkylated:

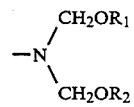

in which the radicals R$_1$ and R$_2$ may be identical or different and are chosen from the group including methyl, ethyl, propyl, butyl and isobutyl.

The coating weight is of the order of 15 g/cm$^2$.

The results are shown in the table below:

| | Bond strength (g/cm) before crosslinking | Steam break-throughs before crosslinking (g/cm) | Bond strength after cross-linking 1' at 150° C. (g/cm) | Steam break-throughs after crosslinking (g/cm) |
|---|---|---|---|---|
| Before aging | 250 | 60 | 400 | 0 |
| After aging 3 months at 25° C. | 250 | 60 | 400 | 0 |
| After aging 1 year at 25° C. | 200 | 40 | 360 | 0 |
| % drop | 20% | | 10% | |

The fully alkylated melamine resins of Example 2 give fusible products which have the same performance as those produced with the partially alkylated resins of Example 1, but with a markedly improved aging with time.

In Example 2 the drops in the bond strengths (20% with bonding before crosslinking and 10% with bonding after crosslinking) after one year's aging at room temperature (25° C.) are not significant because the fusible product retains practically all its bonding performance and resistance to treatment once bonded to a drapery.

What is claimed is:

1. Fusible interlining comprising a textile substrate used in combination with a single adhesive layer, intended to be bonded to a drapery, wherein the adhesive layer has a two-phase structure comprising:
   (i) at least one adhesive system in the form of a thermoplastic powder of dense granules of a polymeric resin selected from the group consisting of a polyamide, a polyester and mixtures thereof, said polymeric resin lacking functional groups capable of entering a cross-linking reaction, and whose main function is to ensure the adhesion of the fusible interlining to the drapery at the time of the bonding;
   (ii) at least one crosslinkable system comprising at least one crosslinkable polymeric resin containing carboxylic, hydroxyl or amide groups which enable them to undergo an irreversible crosslinking reaction and at least one hardener, in the form of a homogeneous matrix whose main function is to coat the granules of thermoplastic powder of the bonding system, the hardener being an alkylated melamine.

2. Fusible interlining according to claim 1, wherein the hardener(s) of the crosslinkable system is(are) selected from the group consisting of melamine resins in the form of prepolymers.

3. Fusible interlining according to claim 2, wherein the melamine resin prepolymers are selected from the group consisting of prepolymers which have a degree of polymerisation of between approximately 1 and 3.

4. Fusible interlining according to claim 2, wherein the melamine resins are selected from the group consisting of partially alkylated melamine resins with a high content of imine functional group:

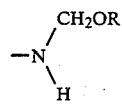

in which the radial R is selected from the group consisting of methyl, ethyl, propyl, butyl and isobutyl radicals.

5. Fusible interlining according to claim 2 wherein the melamine resins are selected from the group consisting of fully alkylated melamine resins:

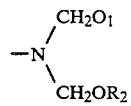

in which the radicals $R_1$ and $R_2$ are identical or different and are selected from the group consisting of methyl, ethyl, propyl, butyl and isobutyl radicals.

6. Fusible interlining according to claim 1, wherein the crosslinkable resin of the crosslinkable system is selected from the group consisting of polymers which are soluble in water or in a solvent medium.

7. Fusible interlining according to claim 1, wherein the crosslinkable resin is selected from the group consisting of epoxy, resins, alkyd resins, polyester resins and acrylic resins, by themselves or mixed with each other.

8. Fusible interlining according to claim 1, wherein the crosslinkable system additionally comprises a crosslinking catalyst.

9. Fusible interlining according to claim 8, wherein the crosslinking catalyst is selected from the group consisting of para-toluenesulphonic acid, oxalic acid, phosphoric acids, ammonium chloride and magnesium chloride.

10. Fusible interlining according to claim 1, wherein the thermoplastic powder of dense granules of the adhesive system has a particle size of between approximately 1 and 100 μm.

11. Fusible-drapery composite consisting of a fusible interlining which comprises a textile substrate used in combination with a single adhesive layer, intended to be bonded to a drapery, wherein the adhesive layer has a two-phase structure comprising:
   (i) at least one adhesive system in the form of a thermoplastic powder of dense granules of a polymeric resin selected from the group consisting of a polyamide, a polyester and mixtures thereof, said polymeric resin lacking functional groups capable of entering a cross-linking reaction, and whose main function is to ensure the adhesion of the fusible interlining to the drapery at the time of the bonding;
   (ii) at least one crosslinkable system comprising at least one crosslinkable polymeric resin containing carboxylic, hydroxyl or amide groups which enable them to undergo an irreversible crosslinking reaction and at least one hardener, in the form of a homogeneous matrix whose main function is to coat the granules of thermoplastic powder of the bonding system, in which the chains of thermoplastic polymers are trapped in a crosslinked network formed by the crosslinkable resin and the hardener(s) of the crosslinkable system, thus forming semiinterpenetrated polymer networks.

* * * * *